United States Patent [19]

Tausig

[11] 4,211,502
[45] Jul. 8, 1980

[54] BREAKAWAY PIN RELEASE
[75] Inventor: Wayne R. Tausig, Oxnard, Calif.
[73] Assignee: The United States of America as represented by the Secretary of the Navy, Washington, D.C.
[21] Appl. No.: 55,923
[22] Filed: Jul. 6, 1979
[51] Int. Cl.² .............................................. B25G 3/18
[52] U.S. Cl. ....................................... 403/324; 403/2; 9/8 R
[58] Field of Search .................. 403/2, 315, 324, 353; 9/8 R, 9

[56] References Cited
U.S. PATENT DOCUMENTS

| | | | |
|---|---|---|---|
| 1,160,122 | 11/1915 | Amberger | 9/8 R |
| 1,408,530 | 3/1922 | Pierce | 403/324 |
| 2,662,712 | 12/1953 | Rose | 403/324 X |
| 2,903,716 | 9/1959 | Zasada | 9/8 R |
| 3,162,870 | 12/1964 | Laird | 9/8 R UX |
| 3,760,440 | 9/1973 | Casciano | 9/8 R |
| 3,965,512 | 6/1976 | Bennett et al. | 9/8 R |

Primary Examiner—Wayne L. Shedd
Attorney, Agent, or Firm—Richard S. Sciascia; Joseph M. St.Amand; William C. Daubenspeck

[57] ABSTRACT

A pin release assembly in which a release pin and a pull pin have mating portions which interlock within a fixed collar. The interlocking surfaces of the mating portions are oriented parallel to or normal to the longitudinal axis of the pins so that no frictional side loads are produced when the interlocked pins are pulled in a direction parallel to the longitudinal axis. The release is actuated by sliding the interlocked pins within the collar. The length of travel of the release pin necessary to accomplish the desired release is coordinated with the length of travel of the mating portions within the collar so that the interlocking surfaces are pulled from the confinement of the collar at the same time as the release is accomplished, thereby permitting the pull pin and the release pin to freely separate.

6 Claims, 8 Drawing Figures

BREAKAWAY PIN RELEASE

BACKGROUND

This invention relates generally to release devices and more particularly, to a direct-acting pin release device in which the pull pin separates from the release pin at a predetermined throw.

In many deep ocean applications in which free-surfacing vehicles are released to the surface from a deep submergence vehicle (DSV), the final release requires that a large release pin be pulled by the DSV's manipulator arm. For example, the design of a free-surfacing cable reel required a pin pull to first release the reel from the DSV, and a second pin pull to start the reel on its journey to the surface. In both cases, however, the pin throw required to release the reel was less than the throw required to disengage the release pin from the frame which is attached to the reel and also supports the release pins. As a consequence, a dangerous situation is possible in which the reel may be released (i.e., a weight may be dropped or a trigger released even though the DSV manipulator is still connected to it because the release pin is still in the frame. If the DSV manipulator is holding onto the release pin, it is in contact with the release reel, and therefore in a precarious position.

In order to eliminate the type of problem, release devices have been designed that trip the final release mechanism indirectly. The manipulator pulls a pin with a short throw which, in turn, triggers another trip and activates the main release pin. The main release pin is almost always spring activated. Consequently, the spring which operates the main release must be strong enough to release the tension of whatever the pin is locking. The pull of the manipulator on the pin has no direct effect on the final release which depends directly on the spring tension.

SUMMARY OF THE INVENTION

It is an object of the present invention to provide a pin release device in which a primary pin pull directly actuates the final release.

Another object of the present invention is to provide a direct-acting pin release device in which several release pins may be pulled simultaneously.

A further object of the present invention is to provide a direct-acting pin release device in which the release throw is minimized.

Another object of the present invention is to provide a pin release device in which the release pin breaks away immediately after release so that the release pin is in no way connected to the activating mechanism.

Yet another object of the present invention is to provide a pin release device having no need for a secondary trip release.

Still another object is to provide a pin release device that does not rely on calibrated springs.

Another object of the present invention is to provide a pin release device in which there are no frictional side loads during the pin pull which may cause the device to jam or increase the pulling force required for release.

A breakaway pin release according to the present invention includes a release pin and a pull pin which are mated in an interlocking arrangement which is slidable within a collar. The release pin which actuates the release is effectively integral with the pull pin as long as the interlocking portions of the pins are within the collar. The release is accomplished by pulling the interlocked pins through the collar for a distance necessary to disengage the release pin from release mechanism. The collar and the interlocking portions are dimensioned so that the interlocking portions are pulled out of the collar simultaneously with disengagement of the release pin. The pull pin is then free to separate from the release pin since they are no longer held together by the collar. The surfaces of the interlocking portions are oriented parallel to or normal to the direction of travel (direction of pull) of the interlocking pins within the collar to avoid unwanted side loads.

Other advantages and features of the invention will become apparent from the following detailed description of the invention when considered in conjunction with the accompanying drawing wherein:

DESCRIPTION OF THE PREFERRED EMBODIMENT

Figure 1:
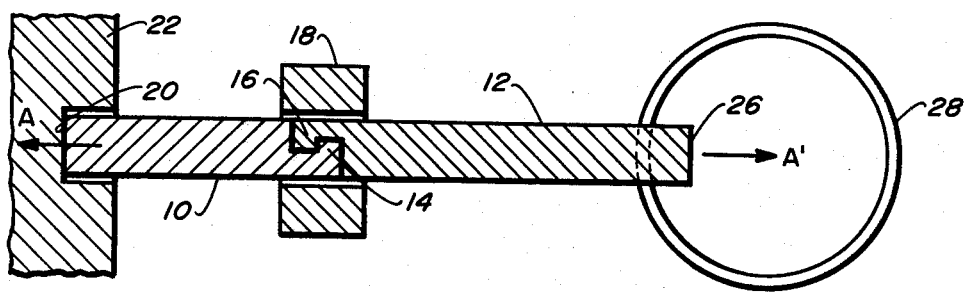
FIG. 1 is a sectional view showing a preferred embodiment of the breakaway pin release of the present invention in the unreleased condition.
Figure 2:
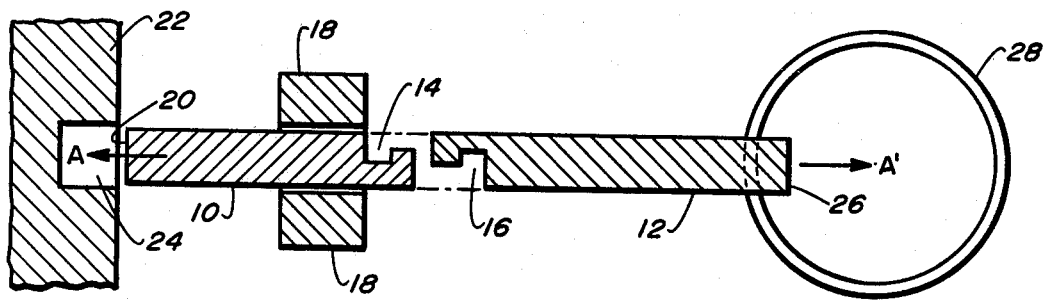
FIG. 2 is a sectional view similar to FIG. 1 showing the device in released condition.

Referring now to the drawing wherein like reference characters designate like or corresponding parts throughout the several views and, in particular to FIGS. 1 and 2 which show a preferred embodiment of the breakaway pin release in engaged (unreleased) condition and released condition, respectively, the breakaway pin release includes a release pin 10 and a pull pin 12. The release pin 10 and pull pin 12 have complementary mating surfaces 14 and 16, respectively, which are held in an interlocking arrangement by a collar or sleeve 18 in the engaged condition. The collar 18 which surrounds the mated release pin 10 and pull pin 12 has a cross-sectional area that permits the interlocked pins to slide longitudinally within the collar while the collar itself is held fixed. The mating surfaces 14 and 16 of the release pin 10 and the pull pin 12 are preferably oriented so that the pin interfaces are parallel to or normal to the longitudinal axis of A—A' of the interlocked pins. This arrangement is preferred because a pulling force on the pull pin 10 along axis A—A' will produce loading only in the A—A' direction. However, if the interface between the pins is inclined relative to the longitudinal axis (see FIGS. 5a-5d), frictional side loads (normal to the inclined surfaces) will result from a force along axis A—A'. This side loading may cause the pins to jam in the collar or increase the force necessary to slide the inerlocked pins within the collar.

The release pin 10 has its distal end 20 coupled to a release mechanism. For example, the distal end 20 may be coupled to an object 22 to be released by insertion in a cavity 24 so that linear motion of the release pin 10 in direction along axis A—A' will uncouple the release pin from the object 22. It will be recognized that various release mechanisms are appropriate for coupling the release pin 10 to the object 22 depending on the structure of the object. The distal end 26 of the pull pin 12 is coupled to a pull ring 28 which may be grasped by pulling apparatus (not shown). The collar 18 is dimensioned so that the mating portion of the pins may be confined within the collar for a distance equal to the length of travel along A—A' required to decouple the distal end of the release pin 10 from the object 22.

In the unreleased condition, as shown in FIG. 1, the mating portions of the release pin 10 and the pull pin 12 are confined by the collar 18. As long as the mating portions are interlocked within the collar 18, the pull pin 12 is effectively an integral part of the release pin 10. When breakaway pin release is actuated by pulling on the pull pin 12 along axis A—A', the release pin 10 and pull pin 12 slide within the collar 18 as a single unit to disengage the release pin 10 from the object 22. As the interlocked pins travel in the A—A' direction, the same distance of travel along A—A' is required to disengage the release pin 10 from the object 22 as is required to remove the interlocked surfaces 14 and 16 from the confinement of the collar 18. Therefore, as shown in FIG. 2, the pull pin 12 may freely breakaway from the release pin 10 simultaneously with the uncoupling of the release pin from the object 22.

Figure 3:
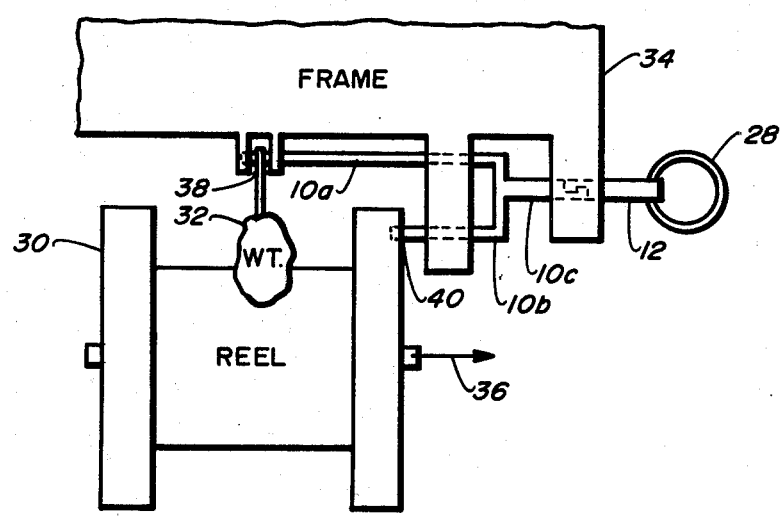
FIGS. 3 and 4 are a pictorial view and a sectional view, respectively, of another embodiment of the breakaway pin release illustrating that pins having different lengths and pull requirements may be pulled simultaneously according to the present invention.
Figure 4:
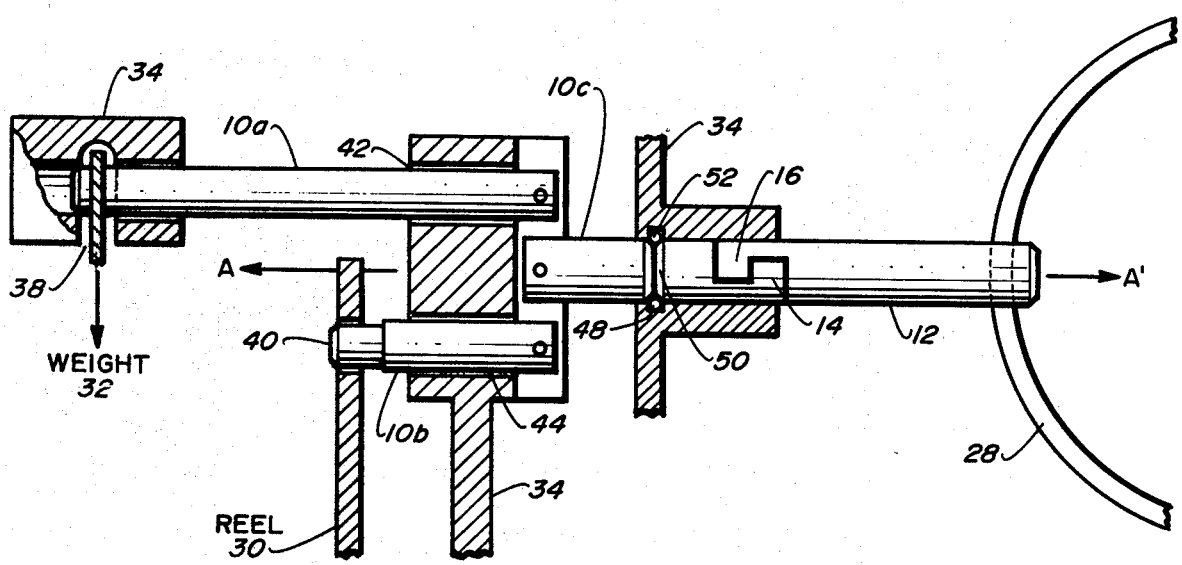
Figure 5A:
FIGS. 5a-5d show alternate geometries for the interlocking surfaces of the pull pin and the release pin.
Figure 5B:
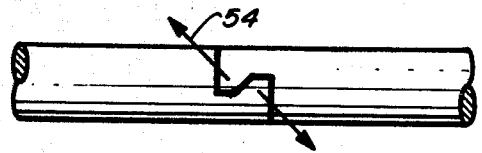
Figure 5C:
Figure 5D:
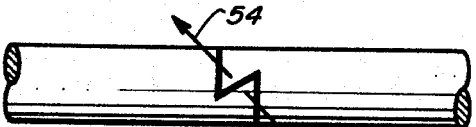

FIGS. 3 and 4 show another embodiment of a breakaway pin release as applied to the release of a DSV free surfacing cable reel illustrating that the present invention may be used to simultaneously pull release pins having different lengths and pull requirements. FIG. 3 illustrates an overall view of the cable reel 30 and related assemblies while FIG. 4 is a sectional view illustrating a breakaway pin release according to the present invention. In this application, a release is requried to drop a weight 32 suspended by a first pin from a frame 34 and also release a second pin to allow the cable reel to rotate on axis 36, the releasing actions occurring simultaneously. The release pin 10 includes three sections 10a, 10b and 10c, with release section 10a having its distal end coupled to the weight release mechanism 38 and release section 10b having its distal end coupled to the cable reel locking mechanism 40. The release sections 10a and 10b pass through apertures 42 and 44 in the frame 34 which provides support for the reel 30 and for the release sections 10a and 10b. The other ends of the release sections 10a and 10b are coupled to one end of mating section 10c which has the surface 14 of its other end adapted for mating with the surface 16 of a pull pin 12 to form an interlocking arrangement between the pull pin 12 and the release pin 10. In the unreleased condition, pull pin 12 and the mating section 10c are mated within an aperture 46 in the frame 34 which also serves as a collar to hold the pins in an interlocked state during this time.

An aperture 46 has an annular channel 48 which is aligned with an annular groove 50 in the mating section 10c of the release pin 10 when the breakaway pin release is in the engaged position. An O-ring 52 is disposed within the annular cavity formed by the annular channel 48 and the annular groove 50. This arrangement applies frictional loads to the release pin 10 to prevent the release pin from accidentally returning to its unreleased position after it has been released or the pulling force removed.

In operation, the breakaway pin release is unactuated as long as the interlocking surfaces of the release pin mating section 10c and the pull pin 12 are contained within the collar (frame 34). When the release pin 10 and the pull pin 12 are mated within the frame 34, the pull pin 12 is effectively an integral part of the release pin 10. The breakaway pin release is actuated by pulling on the pull pin 12 the direction A—A' which results in movement of release sections 10a and 10b of release pin 10 which disengages the sections from the weight release mechanism 38 and the cable reel locking mechanism 40, respectively. At the same time as the release sections are disengaged, the interlocking mechanism is pulled out of the frame 34 (collar) so that the interlocking (mating) surfaces are not confined and are therefore free to separate. Thus, two releases are accomplished with a single throw, after which the pull pin 12 is free to breakaway, freeing the pull pin and the pulling mechanism (such as a manipulator) from the released assembly.

FIGS. 5a–5d illustrate alternate geometries for the interlocking surfaces 14 and 16 of the release pin 10 and the pull pin 12. Obviously may other geometries are possible. However, it is noted that a geometry in which the interlocking surfaces are parallel to or normal to the direction of pull on the pull pin 12 as shown in the embodiments of FIGS. 1–4 are preferred since geometries such as shown in FIGS. 5a–5d produce normally unwanted side loading in the directions shown by the arrows 50.

Obviously, many modifications and variations of the present invention are possible in the light of the above teachings. It is therefore to be understood that within the scope of the appended claims the inventions may be practiced otherwise than as specifically described.

What is claimed is:

1. A breakaway pin release assembly comprising:
   a collar having a bore therein;
   a release pin slidably mounted in said collar, said release pin having a first end adapted for coupling to a release mechanism, the release mechanism being actuated by linear movement of said release pin along its longitudinal axis, said release pin having a mating portion adapted for interlocking with another pin within said collar;
   a pull pin having a first end adapted to be pulled and a mating portion adapted for interlocking with the mating portion of said release pin within said collar, said release pin and said pull pin slidable as a unit through said collar as long as the mating portions of said pull pin and said release pin are interlocked within said collar, said pull pin being free to separate from said release pin when said mating portions are not within said collar.

2. A breakaway pin release as recited in claim 1 wherein the interlocking surfaces of said mating portions of said pull pin and said release pin are oriented parallel to or normal to the longitudinal axis of said pins, said orientation producing no frictional side loads when said interlocked pins are pulled in a direction parallel to said longitudinal axis.

3. A breakaway pin release as recited in claim 2 wherein said release pin includes:
   a mating portion having a first end and a second end, said first end being adapted for interlocking with another pin within said collar;
   a first release section having a first end adapted for coupling to a first release mechanism, the first release mechanism being actuated by linear movement of said first release section along its longitudinal axis, said first release section having end rigidly coupled to the second end of said mating portion;

a second release section having a first end adapted for coupling to a second release mechanism, the second mechanism being actuated by linear movement of said second release section along its longitudinal axis, said second release section having a second end rigidly coupled to the second end of said mating portion.

4. A breakaway pin release as recited in claim 2 wherein said release pin includes:

a mating portion having a first end and a second end, said first end being adapted for interlocking within another pin within said collar;

at least two release sections, each release section having a first end adapted for coupling to a release mechanism and the release mechanism being actuated by linear movement of said release section along its longitudinal axis, each said release section having a second end rigidly coupled to the second end of said mating portion.

5. A breakaway pin release as recited in claim 1 further comprising:

means for providing friction between said release pin and said collar to prevent said release pin from accidentally returning to its original position after release.

6. A breakaway pin release as recited in claim 5 wherein said collar has an annular channel and said release pin has an annular groove, said channel and said groove being disposed to form an annular cavity when said release pin is in the engaged position;

and further comprising an O-ring disposed in said cavity;

said annular channel, annular groove and said O-ring providing said means for providing friction between said release pin and said collar.

* * * * *